March 10, 1959
W. J. MATTOX
2,877,174
REGENERATION PROCESS
Filed May 1, 1953
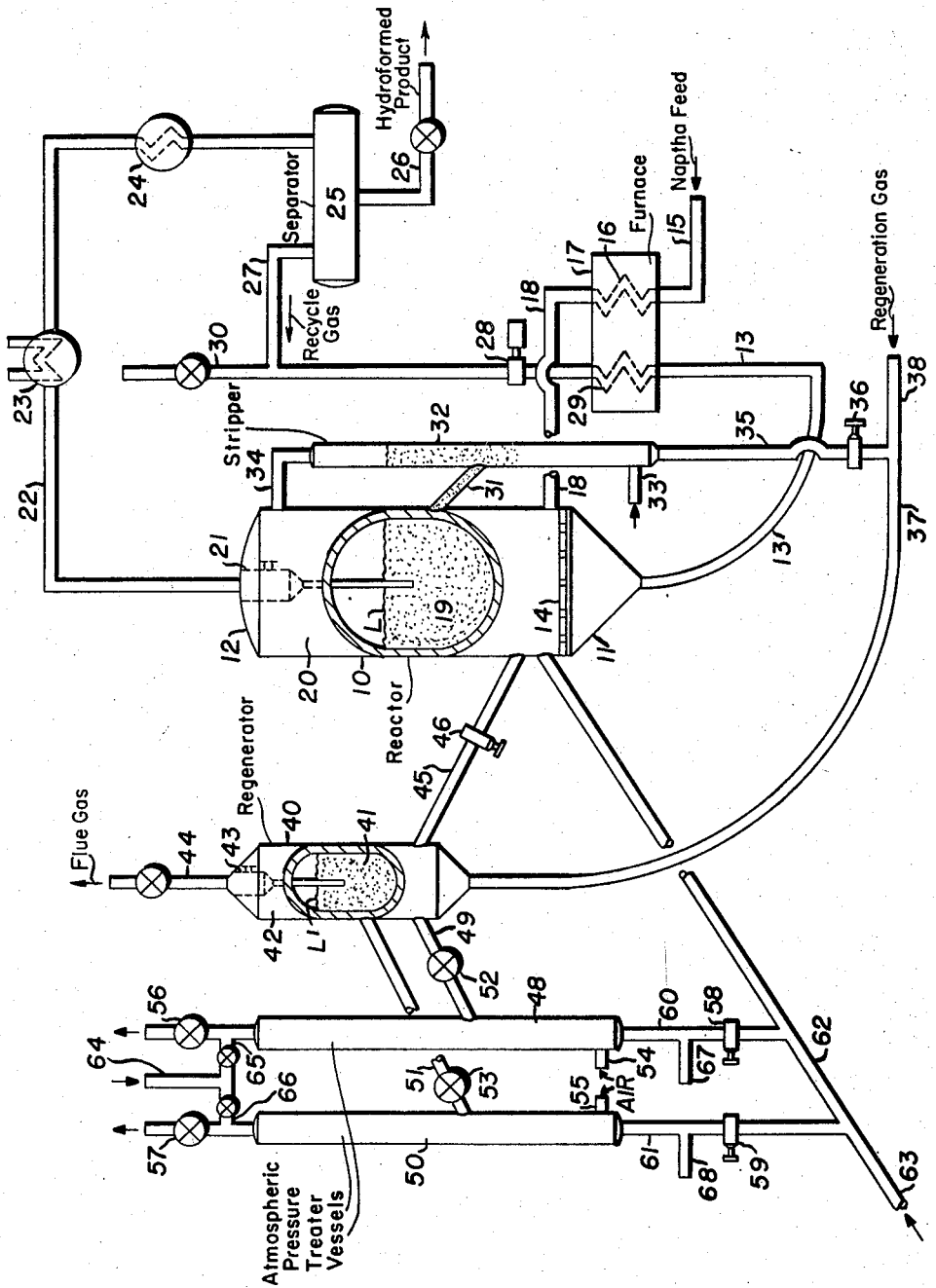
William J. Mattox   Inventor
By H. M. Feyrer   Attorney

United States Patent Office 2,877,174
Patented Mar. 10, 1959

2,877,174

REGENERATION PROCESS

William J. Mattox, Baton Rouge, La., assignor to Esso Research and Engineering Company, a corporation of Delaware Application May 1, 1953, Serial No. 352,360

5 Claims. (Cl. 208—136)

This invention relates to the catalytic conversion of hydrocarbon fractions boiling within the motor fuel range of low knock rating into high octane number motor fuels and particularly to a process whereby such conversion is effected by the fluidized solids technique.

Hydroforming is a well-known process for treating hydrocarbon fractions boiling within the motor fuel or naphtha range to upgrade the same or increase the aromaticity and improve the anti-knock characteristics of said hydrocarbon fraction. By hydroforming is ordinarily meant a hydrocarbon conversion conducted at elevated temperatures and pressures in the presence of solid catalyst particles and hydrogen whereby the hydrocarbon fraction is increased in aromaticity and in which conversion there is no net consumption of hydrogen. Hydroforming is ordinarily carried out in the presence of added hydrogen or hydrogen-rich recycle gas at temperatures of 750–1050° F. in the pressure range of about 50 to 1000 lbs. per sq. inch and in contact with such catalysts as molybdenum oxide, chromium oxide or, in general, oxides or sulfides of metals of groups IV–VIII of the periodic system of elements, alone, or generally supported on a base or spacing agent such as alumina gel, activated alumina, precipitated alumina or zinc aluminate spinel.

It has been proposed to effect the hydroforming of naphtha fractions in a fluidized solids reactor system in which the naphtha feed vapors are passed continuously through a dense, fluidized bed or mass of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and other equipment can be designed for single rather than dual functions, (3) the reactor temperature is substantially constant throughout the dense bed, (4) the regeneration or reconditioning of the catalyst may be readily controlled and (5) the hot, regenerated catalyst can be used to supply at least a part of the heat required for hydroforming to the reaction zone.

In fluid hydroforming the reactor is necessarily maintained at elevated pressures which, in the case of molybdenum oxide-alumina type catalysts is optimum at about 200 lbs. per sq. inch. Due to the large quantities of catalyst circulated through the system, it is necessary to operate the regenerator at a pressure approximately equal to that maintained in the reactor. It has been found however that continued operations under pressure with catalysts of this type results in a severe decline in activity. This decline in activity is not a result of permanent deactivation of the catalyst since catalyst that has shown such a decline in activity has been withdrawn from a continuous fluid unit and tested in small scale laboratory test units where it appeared to have high activity. It is known that group VI metals such as molybdenum and chromium not only form a number of different oxides of varying catalytic activity but the several oxides can exist in amorphous as well as crystalline forms and the catalytic activity will be dependent upon the physical as well as the chemical form of the oxides. Water has a pronounced effect upon the physical characteristics of the catalytic metal oxide as well as upon many of the common catalyst supports or spacing agents. Water or water vapor comes into contact with hydroforming catalysts in continuous fluid hydroforming operations in a number of different ways and in varying amounts. For example, steam is frequently used to strip hydrogen or hydrocarbon materials from spent catalyst particles before subjecting the same to regeneration. During regeneration, water is formed in varying amounts by combustion of residual hydrogen and hydrocarbon materials associated with the spent catalyst. Moreover, the regenerated catalyst that is normally oxidized to the highest state of oxidation, for example $MoO_3$, is partially reduced by treatment with hydrogen-containing gas before reintroduction into the reaction zone or by the action of the hydrogen-containing reaction mixture in the reaction zone itself. The catalyst particles are subjected not only to the action of water but also to the action of other gaseous materials such as carbon oxides and also various sulfur compounds which may become adsorbed upon the catalyst and exert a deactivating effect upon the catalyst.

It is the object of this invention to provide the art with an improved fluid hydroforming process.

It is also the object of this invention to provide the art with an improved fluid hydroforming process which avoids losses in catalyst activity due to adsorption of various process gases.

These and other objects will appear more clear from the detailed specification and claims which follow:

In accordance with the present invention, catalyst deactivation due to adsorption of process gases in a continuous fluid hydroforming system is avoided or minimized by withdrawing a small portion of the hot regenerated catalyst and treating the withdrawn catalyst at or near atmospheric pressure with dry air. At the low or atmospheric pressure at which this treatment is effected, water, carbon oxides and sulfur compounds are readily desorbed, particularly since the catalyst is at or only slightly below regenerator temperature. Although the process conditions, the feed stock and the like will be the principal determining factors, only a very small percentage of the catalyst being circulated need be treated at low pressure at any one time. A rate such that the total quantity of catalyst is treated at low pressure every one or two days will be adequate in most instances. Since the quantities of catalyst are relatively small, the atmospheric or low pressure treatment can be effected in one or preferably two small auxiliary vessels connected to the regenerator and arranged to operate cyclically so that one is receiving regenerated catalyst and being treated with air at substantially atmospheric pressure while the other is being repressured for recycling or return of the treated catalyst to the reaction system.

The accompanying drawing illustrates in the single figure a diagrammatic flow plan in accordance with the present invention.

Referring to the drawing, 10 is a reactor vessel which may desirably be an elongated vertical, cylindrical vessel provided with an inverted inlet cone 11 at its bottom and a dome shaped closure 12 at its upper end. A line 13 is connected to the bottom of the reactor 10 for supplying hydrogen-rich recycle gas to the inlet cone 11 and thence to the reactor. A perforated distributing plate or grid 14 is preferably arranged within the reactor vessel in order to insure uniform distribution of the incoming recycle gas over the entire cross section of the reactor vessel 10.

Fresh naphtha feed is supplied through inlet line 15 to preheat coils 16 in furnace 17 and passes thence through line 18 to suitable distributor rings or nozzles within the reactor and which are preferably arranged a short distance above the plate or grid 14. The reactor is charged with finely divided hydroforming catalyst particles the major portion of which is between 20 and 80 microns in diameter with at most about 5 wt. percent of 0–20 and at most about 5 wt. percent of 80–200 micron particles in the mixture. The velocity of the vapors and gases through the reactor 10 are so controlled as to establish a dense, fluidized, liquid-simulating bed 19 having a definite level L or interface separating said dense bed 19 from a dilute or disperse phase 20 comprising vaporous reaction products and small amounts of catalyst entrained therewith. Reaction products are withdrawn overhead from reactor 10 through a cyclone separator 21 or the like which serves to separate the bulk of the entrained catalyst for direct return to the reactor dense bed 19 through the dip leg attached to the base of the cyclone separator. Reaction products substantially free of catalyst particles pass through outlet line 22, through heat exchanger 23 where they are brought into indirect heat exchange relation to cold fresh feed or recycle gas to preheat the latter, and thence through condenser 24 whereupon the reaction products are discharged into separator 25 from which liquid product or hydroformate is withdrawn through line 26 and passed to suitable stabilizing and storage equipment. The uncondensed product comprising hydrogen and normally gaseous hydrocarbons are withdrawn from separator 25 through line 27, passed through compressor 28 and then through preheating coils 29 in furnace 17 whereupon the preheated recycle gas is supplied through line 13 to the inlet cone 11 at the bottom of the reactor. Excess process gas is vented from the system, as necessary, through valve controlled outlet line 30.

Catalyst particles are continuously withdrawn from the dense, fluidized bed 19 through withdrawal line 31 and discharged into stripper conduit or cell 32. Steam or an inert stripping gas is supplied through line 33 into the bottom of stripper cell 32 and passed upward, countercurrent to the descending catalyst particles in order to strip hydrogen or vaporizable hydrocarbons from the spent catalyst particles and thereby avoid the burning of recoverable products in the regeneration zone. The stripping gas and stripped products pass overhead from stripper 32 through line 34 and are preferably discharged into the dilute phase 20 in the upper part of the reactor vessel for handling with the main body of product vapors since it is ordinarily desirable to bypass the stripping gas, especially steam, around the main reactor dense bed. While the stripping vessel is shown outside the reactor vessel, it could also be arranged, if desired, within the reactor vessel in known manner.

The spent catalyst particles substantially free of volatilizable materials pass from the bottom of stripping cell 32 into standpipe 35 wherein sufficient fluistatic pressure is built up to convey the spent catalyst through the regenerator system. A slide valve 36 or the like is arranged in the standpipe in order to control the rate of withdrawal of spent catalyst from the reactor side. The spent catalyst particles are discharged from standpipe 35 into transfer line 37 where they are picked up by a stream of carrier gas or regeneration gas such as air supplied through line 38 and carried to regenerator 40. If air is used as the carrier gas, it is ordinarily preferred that only part of the air necessary for regeneration be used as carrier gas and the remainder added at spaced points in the transfer line or directly into the regenerator itself. While the regenerator is shown as a separate vessel, the transfer line 37 itself can serve as the regenerator or other types of regenerator vessels, for example, a perforated tray type or other stage regenerator vessels can be used. If tray type or other regenerators are used which permit stagewise regeneration, it is preferable to supply the spent catalyst to the uppermost tray and the regeneration gas or air below the lowermost tray so that spent catalyst will initially contact regeneration gases poor in oxygen and then with gases progressively richer in oxygen. In the simple regenerator vessel 40 shown, catalyst particles and regeneration gases are supplied at such a rate that a dense, fluidized bed 41 of catalyst particles and regeneration gases is formed having a definite level L' or interface separating said dense bed from a dilute or disperse phase 42 in the upper part of the regenerator vessel. Regeneration gases are taken overhead from regenerator vessel 40 through cyclone separators 43 or the like for separating the bulk of the entrained catalyst particles. The regeneration gases substantially devoid of catalyst particles pass through valve-controlled outlet line 44 to a waste gas stack or flue or to suitable scrubbing and storage equipment in the event that it is desired to utilize this gas as stripping or carrier gas in the process. In view of the fact that the amount of heat liberated in the regenerator is greater than can be conveyed to the reactor by the catalyst at the catalyst circulation rates normally employed for selectivity considerations it is ordinarily necessary to provide cooling coils in the regenerator to control temperature therein. A desirable arrangement is one in which two coils are provided, one of which is completely submerged and the other of which is partially submerged in dense bed 41. In this arrangement, the heat exchange capacity of the system can be readily varied by simply varying the dense bed level in the regenerator.

Regenerated catalyst particles are withdrawn from regenerator 40 through transfer line 45. The catalyst particles may be subjected to stripping with an inert gas to remove residual combustion gases or to the action of hydrogen or hydrogen-rich recycle gas in transfer line 45 in order to effect a pretreatment or partial reduction of the catalytic metal oxides prior to reintroducing the regenerated catalyst into the reactor vessel. A slide valve 46 or the like is arranged in the transfer line 45 to control the rate at which regenerated catalyst is returned to the reactor dense bed 19.

The several apparatus elements and the mode of operation described to this point represent a conventional fluid hydroforming reactor system. In accordance with the present invention, however, there is provided means for depressuring a portion of the catalyst inventory of the system for treatment with air or the like at or near atmospheric pressure. A simple system for accomplishing this is illustrated in the drawing. As there shown, two atmospheric pressure treater vessels 48 and 50 are connected to regenerator vessel 40 below the dense bed level therein by connector lines 49 and 51 respectively. Slide valves 52 and 53 or the like are provided in the connector lines in order to control the withdrawal of regenerated catalyst into the atmospheric pressure treating vessels 48 and 50 respectively. Inlet lines 54 and 55 are connected to the lower part of the treating vessels 48 and 50 for the introduction of air thereinto. Valves 56 and 57 are provided in the outlet lines at the top and valves 58 and 59 are provided in the bottom draw off lines 60 and 61 for the atmospheric pressure treating vessels. The bottom draw off lines 60 and 61 are connected to transfer line 62 which serves to return the treated catalyst to the reactor in admixture, for example, with hydrogen-containing recycle gas supplied at 63 serving as a carrier gas. Gas, which may also desirably be hydrogen-containing recycle gas, is supplied through line 64 and valve controlled branch lines 65 and 66 connected to the top of vessels 48 and 50 respectively in order to repressure the catalyst therein for return to the reactor vessel.

The vessels 48 and 50 are operated in a cyclic manner with one in a depressuring, charging, and atmospheric pressure treating phase of the cycle while the other is in the repressuring and discharging phase of the cycle. The operation of one vessel will be described, it being understood that the second vessel is operated in the same way but in timed relation to the first.

With valve 58 and valve controlled line 65 closed and valve 56 open, valve 52 is opened to permit the passage of a charge of regenerated catalyst into vessel 48. When the desired amount of catalyst has been passed into vessel 48, valve 52 is closed. Air is supplied to vessel 48 through inlet line 54 and, with valve 56 open to the atmosphere or to a line of relatively low back pressure, dry air is passed through the hot regenerated catalyst at substantially atmospheric pressure for approximately ten to fifteen minutes in order to rid the catalyst of any residual combustible materials and to thoroughly strip off adsorbed water, sulfur compounds and/or carbon oxides. When desorption is complete, the introduction of air is discontinued and a purge gas such as nitrogen or other relatively oxygen-free gas stream is supplied through line 67 in order to drive off the air and thereby prevent oxygen carry-over into the reactor. When purging is complete, valve 56 is closed and valve controlled line 65 is opened admitting recycle gas under pressure sufficiently above the reactor pressure to force the treated catalyst from the treating vessel. Valve 58 is opened and the repressured catalyst is discharged into transfer line 62 where it is picked up in a stream of recycle gas and conveyed to the reactor.

The feed or charging stock to the hydroforming reactor may be a virgin naphtha, a cracked naphtha, a Fischer-Tropsch naphtha or the like, having a boiling range of from about 125 to 430° F., or it may be a narrow-boiling cut within this range. The feed stock is preheated alone, or if desired in admixture with recycle gas to reaction temperature or to the maximum temperature possible while avoiding thermal degradation of the feed stock. Ordinarily preheating of the feed stock is carried out to temperatures of about 800-1050° F., preferably about 975° F. Thermal degradation at preheat temperatures can be avoided or minimized by limiting the time of residence in the transfer and feed inlet lines.

Recycle gas, which contains from 40 to 70 or more volume percent of hydrogen, is preheated to temperatures of about 1100-1200° F., preferably about 1185° F., prior to introduction thereof into the reaction zone. The recycle gas should be circulated through the reactor at a rate of from about 1000 to 8000 cu. ft. per bbl. of naphtha feed. The amount of recycle gas added is preferably the minimum amount that will suffice to carry the necessary heat of reaction into the reaction zone and keep carbon formation at a satisfactory low level.

The reactor system is charged with an active hydroforming catalyst such as molybdenum oxide or chromium oxide or group VI metal oxides upon a suitable support such as alumina gel, activated alumina or zinc aluminate spinel. Suitable catalysts contain about 5 to 15 wt. percent molybdenum oxide or from about 8 to 40 wt. percent of chromium oxide upon a suitable support. If desired, minor amounts of stabilizers or promoters such as silica, potassium oxide, cerium oxide, magnesia, or the like may be included in the catalyst composition.

The reactor vessel is operated at temperatures between about 850 and 1050° F., preferably at about 925° F., and at pressures of about 50 to 500 lbs. per sq. inch. Temperatures appreciably above about 925° F. result in increased carbon formation and lower selectivity to gasoline fractions At temperatures below about 900° F., operating severity is low and would, therefore, require an excessively large reaction vessel. Lowering reactor pressure below about 200 lbs. per sq. inch results in increased carbon formation which becomes excessive below about 25 lbs. per sq. inch. Above 200 lbs. per sq. inch catalyst selectivity to light products ($C_4$'s and lighter) increases rapidly.

The regenerator vessel is normally operated at essentially the same pressure as the hydroforming reactor vessel and at temperatures of about 1100-1200° F. The average residence time of catalyst in the reactor is from about 2 to 4 hours while the average residence time of the catalyst in the regenerator is of the order of from about 3 to 15 minutes.

A wide combination of treating conditions may effectively be carried out in the low pressure oxidation or reactivation system. Ordinarily, treatment of about 1-5% of the catalyst inventory per hour at a temperature of approximately 1000-1200° F. with relatively dry air will be adequate. If a one-hour cycle is employed, it may, for example, be divided approximately as follows: 15 minutes for charging with catalyst from the main regenerator, 30 minutes atmospheric pressure air treat, and 15 minutes for discharge to the reactor vessel. The cycle may, of course, be increased or decreased to meet specific requirements. In addition to the cyclic, two-vessel system illustrated, other suitable equipment may also be employed. For example, the treat may be carried out continuously in a single vessel employing lock hoppers or a series of standpipes to reintroduce the reactivated catalyst into the pressurized reactor.

The weight ratio of catalyst to oil introduced into the reactor should be about 0.5 to 1.5. It is preferred to operate at catalyst-to-oil ratios of about 1 since ratios above about 1 to 1.5 result in excessive carbon formation. Somewhat higher weight ratios can be used at higher pressures.

Space velocity or weight in pounds of feed charged per hour per pound of catalyst in the reactor depends upon the age or activity level of the catalyst, the character of the feed stock, and the desired octane number of the product. Space velocity for a molybdenum oxide on alumina gel catalyst may vary, for example, from about 1.5 wt./hr./wt. to about 0.15 wt./hr./wt. Superficial gas velocities through the reactor and regenerator are ordinarily about 0.3 to about 1.5 ft. per second, although higher velocities, limited by cyclone separator overloading, can be used.

The foregoing description contains a limited number of embodiments of the present invention. It will be understood that numerous variations are possible without departing from the scope of this invention.

What is claimed is:

1. A method of hydroforming hydrocarbon fractions which comprises passing hydrocarbons and hydrogen-containing recycle gas in contact with finely divided hydroforming catalyst particles consisting essentially of a catalytic component selected from the group consisting of molybdenum oxide and chromium oxide dispersed upon an alumina-containing support maintained under active hydroforming conditions of elevated temperatures and pressures, continuously subjecting a portion of the catalyst inventory to regeneration in a separate regeneration zone at elevated temperatures and at substantially the same pressure as is maintained in the hydroforming reaction zone, continuously recycling regenerated catalyst to the reaction zone, withdrawing a relatively small amount of catalyst from the regeneration zone, discharging the withdrawn regenerated catalyst into a separate treating zone, reducing the pressure on the catalyst in said treating zone to substantially atmospheric pressure, passing dry air at substantially atmospheric pressure over said catalyst at a temperature of about 1000 to 1200° F. until it is substantially freed of adsorbed water, sulfur compounds and/or carbon oxides, repressuring the treated catalyst particles to the pressurized system pressure and reintroducing the treated catalyst to the pressurized system for recirculation through the reaction and regeneration zones.

2. The process as defined in claim 1 in which the catalyst comprises molybdenum oxide upon an alumina support.

3. The process as defined in claim 1 in which the catalyst comprises molybdenum oxide upon a zinc aluminate spinel support.

4. The process as defined in claim 1 in which the catalyst comprises chromium oxide upon an alumina support.

5. The process as defined in claim 1 in which the catalyst comprises chromium oxide upon a zinc aluminate spinel support.

References Cited in the file of this patent

UNITED STATES PATENTS

| | | |
|---|---|---|
| 2,259,487 | Payne | Oct. 21, 1941 |
| 2,303,717 | Arveson | Dec. 1, 1942 |
| 2,366,372 | Voorhees et al. | Jan. 2, 1945 |
| 2,406,112 | Schulze | Aug. 20, 1946 |
| 2,410,891 | Meinert et al. | Nov. 12, 1946 |
| 2,414,736 | Gray | Jan. 21, 1947 |
| 2,459,480 | Welty | Jan. 18, 1949 |
| 2,530,977 | Martin | Nov. 21, 1950 |
| 2,602,771 | Munday et al. | July 8, 1952 |
| 2,700,015 | Joyce | Jan. 18, 1955 |
| 2,701,786 | Evans et al. | Feb. 8, 1955 |
| 2,733,282 | Drews et al. | Jan. 31, 1956 |
| 2,749,287 | Kirshenbaum | June 5, 1956 |
| 2,772,217 | Nicholson | Nov. 27, 1956 |
| 2,831,800 | Kelso | Apr. 22, 1958 |